(No Model.)

F. A. HAMP.
BICYCLE TIRE.

No. 583,743. Patented June 1, 1897.

WITNESSES:

INVENTOR
F. A. Hamp.
BY
ATTORNEYS.

UNITED STATES PATENT OFFICE.

FRANZ ANTON HAMP, OF TERRE HAUTE, INDIANA.

BICYCLE-TIRE.

SPECIFICATION forming part of Letters Patent No. 583,743, dated June 1, 1897.

Application filed October 26, 1896. Serial No. 610,130. (No model.)

*To all whom it may concern:*

Be it known that I, FRANZ ANTON HAMP, of Terre Haute, in the county of Vigo and State of Indiana, have invented a new and useful Improvement in Bicycle-Tires, of which the following is a full, clear, and exact description.

The object of my invention is to provide a bicycle-tire which will be practically solid and which will have all of the resiliency of an ordinary pneumatic tire with the decided advantage of being absolutely puncture-proof and safe, the tire being of such construction that in the event the outer surface should become worn or even destroyed to a great extent the tire will yet remain in condition for effective use.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
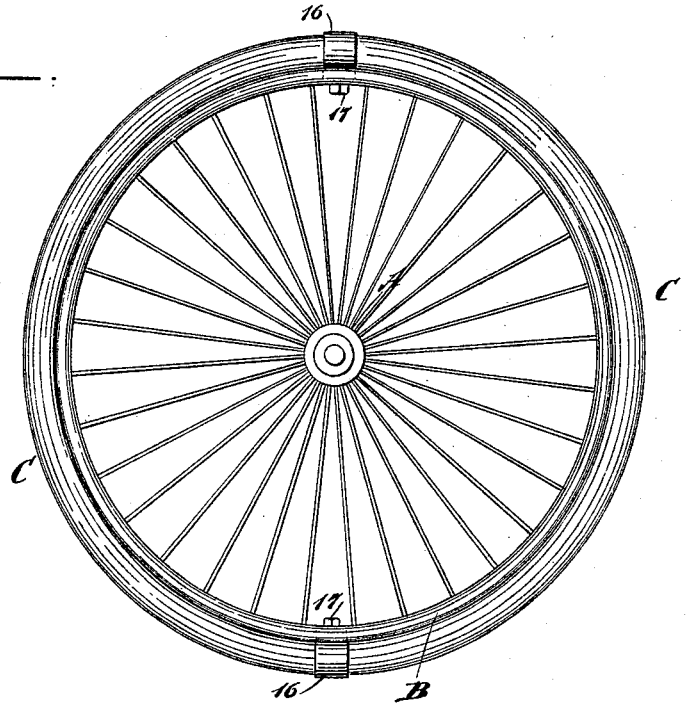
Figure 2:
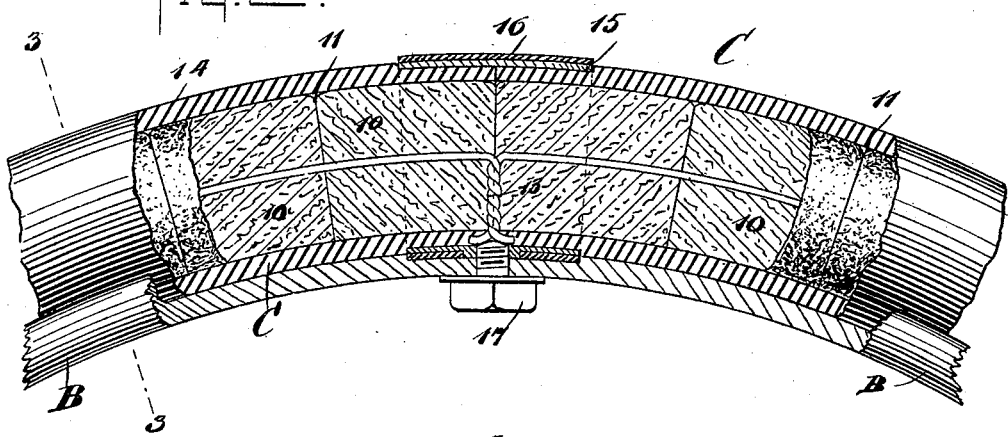
Figure 3:
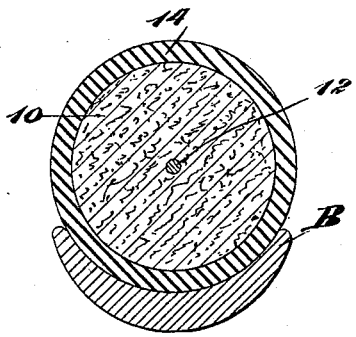

Figure 1 is a side elevation of the wheel and the improved tire applied to the same. Fig. 2 is a partial side elevation and partial sectional view of the improved tire and the rim of the wheel to which the tire is applied, and Fig. 3 is a transverse section taken substantially on the line 3 3 of Fig. 2.

In carrying out the invention the wheel A may be of any desired construction, as may likewise the rim B of the wheel. The tire C, however, has its body portion constructed of cork, and the cork is cylindrical in exterior contour and is divided into sections 10, the ends of the sections being so inclined that when the sections of the body are fitted together there will be no space between them and a perfect ring will be formed around the rim; also, preferably the upper face of each section at one or both ends is slightly rounded off, as shown at 11 in Fig. 2, enabling the opposing faces of the various cork sections to more closely fit together. The sections of the body are firmly held connected by a tie 12, usually made of wire, the wire being passed longitudinally through the center of all of the sections, and the said wire at its ends is then twisted together, as shown at 13 in Fig. 2, and the extremities carried in opposite directions.

The cork sections 10 are contained within a tube 14, preferably made of rubber, which tube constitutes the outer surface of the tire. The ends of the casing-tube 14 are brought together preferably at the point where the tie 12 is secured, and ordinarily a metal sleeve 15 is tightly fitted around the tire where the ends of the casing-tube meet, and this metal sleeve is also preferably provided with a covering 16, of rubber or like material, and ordinarily a second sleeve is employed similar to the sleeve 15 to embrace the tire at a point opposite the sleeve covering the meeting of the ends of the casing-tube.

The tire in its completed form is cemented or otherwise secured upon the rim B, and a set-screw 17 is preferably passed through the rim and through each of the sleeves 15, as shown in Figs. 1 and 2, and the set-screw of the sleeve surrounding the meeting ends of the casing-tube is preferably made to engage with the flaring extremities of the twisted end of the tie-band 12, thus effectually preventing the tie-band from becoming loosened.

It is obvious that a tire constructed in the manner above described will have all of the resiliency that a pneumatic tire possesses and will be absolutely safe, since it will not be in the slightest measure affected by punctures or even the destruction of a large portion of the casing-tube.

The tire is exceedingly light, simple, durable, and economic in its construction.

Having thus described my invention, I claim as new and desire to secure by Letters Patent—

1. The combination, with the rim of a vehicle-wheel, of a tire consisting of a cork body made in sections, a tie-band holding the sections closely one against the other, the said tie-band having its ends twisted and then carried in opposite directions, a cover-tube for the said body, a sleeve fitted around the meeting ends of the cover-tube, the said sleeve being located at the meeting ends of the tie-band, and a set-screw passed through the rim of the wheel into the said sleeve and to an engagement with the flaring extremities of the tie-band, as and for the purpose set forth.

2. The combination with the rim of a vehicle-wheel, of a tire consisting of a cork body made in cylindrical sections located one against the other and having the outer edge of their opposing faces slightly rounded off, a tie-band formed of a single piece of wire inserted through said sections and holding the same in contact, the ends of said band being twisted around each other and having flared extremities, a cover-tube for the said body, a metal sleeve encircling said cover-tube and provided with a cover of rubber or like material, and a set-screw passed through the rim of the wheel and through said sleeve and engaging the flaring extremities of the tie-band, as and for the purpose set forth.

FRANZ ANTON HAMP.

Witnesses:
JOHN BOETTCHER,
CHAS. A. GORDON.